(12) United States Patent
Crain

(10) Patent No.: US 8,925,874 B2
(45) Date of Patent: Jan. 6, 2015

(54) ANTI-TAMPER DEVICE

(75) Inventor: Kevin Louis Crain, Simpsonville, KY (US)

(73) Assignee: Siemens Industry, Inc., Alpharetta, GA (US)

( * ) Notice: Subject to any disclaimer, the term of this patent is extended or adjusted under 35 U.S.C. 154(b) by 760 days.

(21) Appl. No.: 13/166,218

(22) Filed: Jun. 22, 2011

(65) Prior Publication Data

US 2012/0328362 A1   Dec. 27, 2012

(51) Int. Cl.
*B61L 5/20* (2006.01)
*F16B 41/00* (2006.01)
*F16B 7/14* (2006.01)

(52) U.S. Cl.
CPC ............. *F16B 41/005* (2013.01); *F16B 7/1418* (2013.01)
USPC ........ 246/217; 246/111; 246/127; 246/473.1; 403/331; 403/338; 70/18; 70/19

(58) Field of Classification Search
CPC ... F16L 19/0206; F16B 41/005; F16B 7/1418
USPC .......... 24/20 CW, 20 EE, 20 R, 279; 285/80; 70/14, 18, 19, 58, 180, 200, 203; 403/331, 338
See application file for complete search history.

(56) References Cited

U.S. PATENT DOCUMENTS

| | | | | |
|---|---|---|---|---|
| 1,084,996 A * | 1/1914 | Wright | | 70/178 |
| 1,112,189 A * | 9/1914 | Bartholomew | | 292/307 B |
| 2,048,424 A * | 7/1936 | Caldwell | | 70/232 |
| 4,300,373 A * | 11/1981 | Camos et al. | | 70/232 |
| 4,458,923 A * | 7/1984 | Burroughs | | 285/8 |
| 4,630,647 A * | 12/1986 | Thomson | | 138/99 |
| 4,713,863 A * | 12/1987 | Jennings | | 24/20 R |
| 4,742,600 A * | 5/1988 | Calmettes et al. | | 24/20 R |
| 4,803,858 A * | 2/1989 | Parker | | 70/231 |
| 4,826,215 A * | 5/1989 | Sullivan | | 285/80 |
| 4,882,814 A * | 11/1989 | Takahashi | | 24/20 R |
| 4,890,360 A * | 1/1990 | Calmettes et al. | | 24/20 R |
| 5,269,568 A * | 12/1993 | Courturier | | 285/80 |
| 5,806,555 A * | 9/1998 | Magno, Jr. | | 137/385 |
| 5,864,926 A * | 2/1999 | Gyongyosi et al. | | 24/20 R |
| 5,996,186 A * | 12/1999 | Yamada et al. | | 24/20 R |
| 6,032,989 A * | 3/2000 | DeWalch et al. | | 292/256.6 |
| 6,052,873 A * | 4/2000 | Cuno | | 24/20 R |
| 6,568,043 B1 * | 5/2003 | Detable et al. | | 24/20 R |
| 8,632,103 B2 * | 1/2014 | Fahie et al. | | 285/80 |
| 2002/0007536 A1 * | 1/2002 | Keller et al. | | 24/274 R |
| 2004/0238273 A1 * | 12/2004 | Fritskey et al. | | 181/264 |

FOREIGN PATENT DOCUMENTS

EP    2 155 530 B1    11/2010

OTHER PUBLICATIONS

Safetran Systems Corporation, Kentucky Division; Collar Ass'y, Locking; May 19, 2010; 1 page; Louisville, Kentucky, USA.

* cited by examiner

*Primary Examiner* — Victor Macarthur

(57) ABSTRACT

An anti-tamper device in the form of a collar fitted about a housing is provided. The ends of the collar are formed into lock tabs, one of which is formed into a U-shaped portion, or V-shaped portion, to permit capture of the end of the other lock tab. Movement of the captured tab is prevented to resist tampering with the housing. Embodiment of the invention find application, in particular, to a housing for a bell at a railroad level crossing, and prevents loss of the bell due to vandalism.

6 Claims, 3 Drawing Sheets

ANTI-TAMPER DEVICE

FIELD OF THE INVENTION

This invention generally relates to an anti-tamper device, and more particularly, but not exclusively, to an anti-tamper device for use in securing track side rail road equipment.

BACKGROUND OF THE INVENTION

Rail road crossings are examples of access control points that are provided with track side equipment to warn people at the crossing that rail traffic is approaching. Typically, this takes the form of a post bearing a bell which is sounded to provide an audible warning. In addition a visual warning is provided by a set of lights made to flash. Often, the bell is made of brass, bronze, or some other metal which has significant value as scrap metal. Unfortunately, this value has made it attractive for criminals to steal the bell.

In addition to the financial loss, there is also the potential cost of replacement in terms of remedial work to install a new bell, delays to operation of the rail road because of the remedial work and the safety implications to persons using the crossing. Thus, the loss of the bell due to criminal activity or simply vandalism has serious consequences that would be best avoided.

It is known to provide an anti-tamper collar to the equipment to prevent removal of the bell. The collar is fixed over a bell housing between upper and lower tabs which project out of the housing to prevent movement in the vertical plane. Hardware on the housing is obscured by the collar when fitted. This is hardware being used to fix the bell housing to the post. The collar includes two radially-outwardly-extending ends with holes which when aligned permit the insertion of a padlock to retain the ends of the collar together. The padlock is then locked to prevent unauthorized removal.

It has been found however that a certain degree of "play" is available in the prior art arrangement which may permit undesirable manipulation of the lock to allow the collar to be removed. The manipulation can result in the collar being forced upwards beyond the tabs allowing access to the housing hardware. The housing may then be removed to gain access to the bell and its removal.

It would be desirable to have a device which overcomes the problems described above. The invention provides such a device. These and other advantages of the invention, as well as additional inventive features, will be apparent from the description of the invention provided herein.

BRIEF SUMMARY OF THE INVENTION

In one aspect, embodiments of the invention provide an anti-tamper device including a collar fitted about a housing to prevent access to the housing which housing being provided with tabs to prevent movement of the collar relative to the housing in a first direction; the collar comprising first and second ends extending generally radially outwardly from the collar. In an embodiment of the invention, the second end is formed into two limbs into a U-shaped portion and the first end being located within the U-shaped portion such that expansion of the collar is limited by abutment of the first end with the limbs of the second end.

By limiting the expansion of the collar the play available for manipulation of the collar is controlled and may be made to be less than that required to enable the tabs of the housing to be passed.

In a preferred embodiment of the invention, a limb of the second end is cranked to the rest of the limb to provide a release means to open the U-shaped portion and permit removal of the first end from the U-shaped portion. The collar maybe made of any suitable material. In a specific embodiment, the material for the collar is $\frac{1}{16}$-inch-thick (1.5 mm) aluminum.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
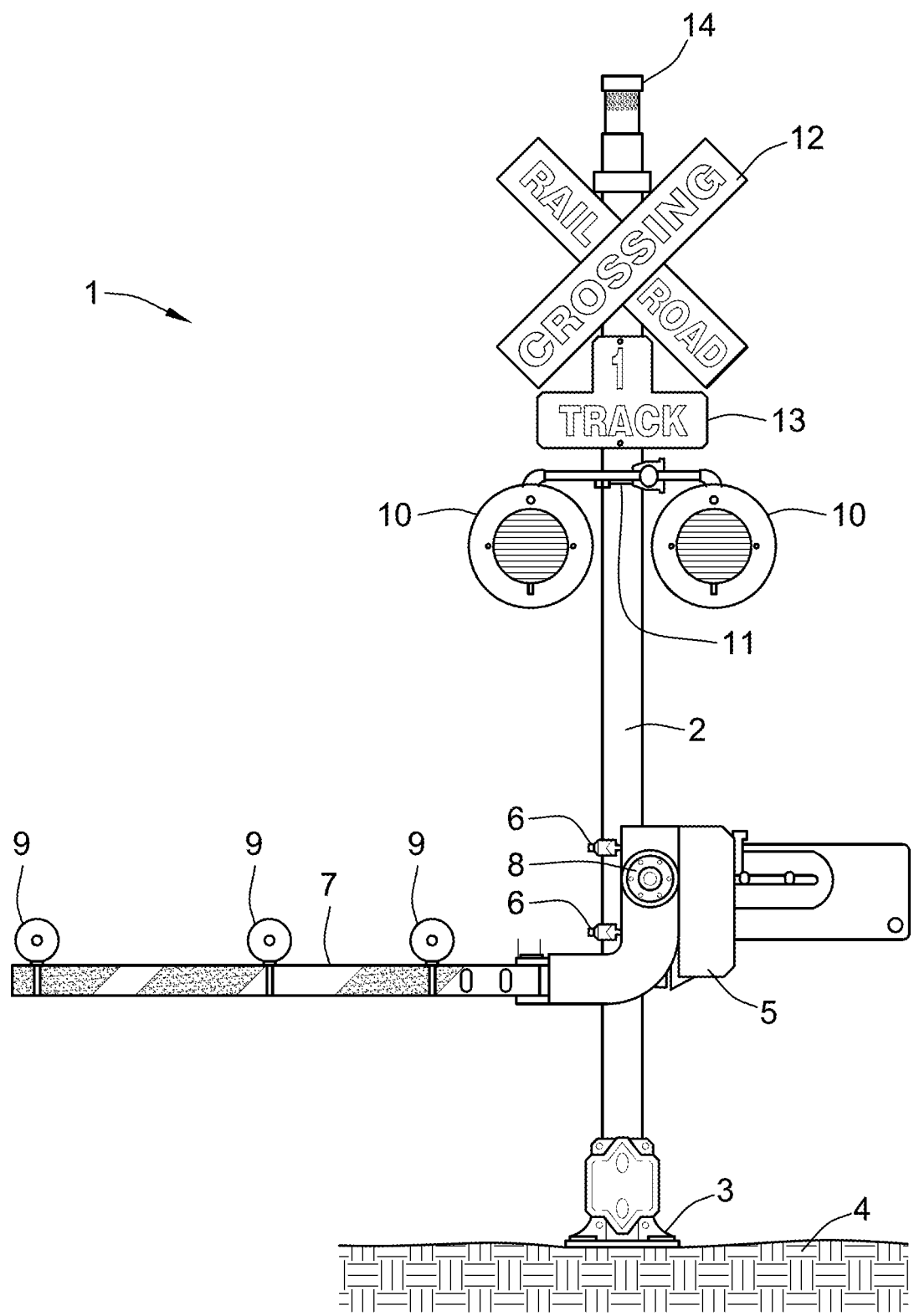
FIG. 1 shows a railroad crossing including an anti-tamper device in accordance with an embodiment of the invention.

As is shown in FIG. 1, a railroad crossing barrier 1 in accordance with the invention comprises a post 2 of tubular steel or aluminum construction mounted by a flanged footplate 3 to a concrete base 4. Typically, it is located near a crossing point over a railroad. A gate mechanism 5 is mounted to the post 2 by a set of upper and lower brackets 6, and a barrier arm 7 is pivotably connected to the gate mechanism 5 via a motorized pivot 8. The motorized pivot 8 may be actuated to permit the barrier arm 7 to be raised from the horizontal position as shown to a vertical position. In this manner the passage of persons or vehicles through the crossing barrier and over the railroad is controlled.

In order to make the crossing barrier more conspicuous to potential users, a series of lights 9 are fixed to the barrier arm and made to flash when the arm is being raised or lowered. A pair of lights 10 is also provided mounted at a higher level to the post 2 by means of brackets and bolts 11. By mounting this pair of lights at a relatively high position, the crossing barrier operation is made more conspicuous to vehicle drivers particularly where there is a line of traffic at the approach to the crossing. In addition, the crossing barrier is provided with a railroad crossing sign and track indicator sign 12 and 13.

Figure 2:
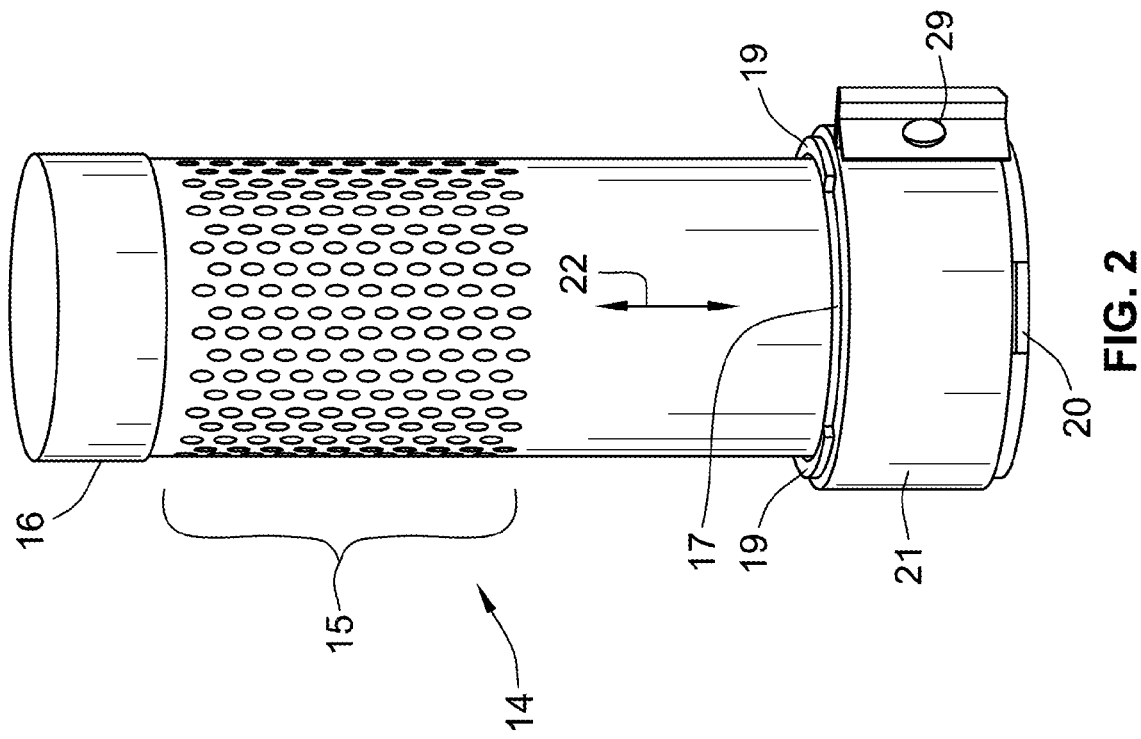
FIG. 2 shows an enlarged view of a bell housing present in the railroad crossing shown in FIG. 1.

At the top of the post is mounted an electronic bell assembly 14 also in accordance with the invention. As is shown in FIG. 2, the bell assembly 14 is generally cylindrical and provided over the upper portion with a plurality of through holes 15. These connect the exterior of the bell assembly 14 to an interior bell chamber which contains a bell (brass or electronic) (not shown) to allow the efficient propagation of sound therefrom. An end cap 16 is fixed to close the assembly at the uppermost end.

The lower end of the assembly is provided with an aluminum base 17. The base 17 is provided with hardware (not shown) to fix the bell assembly 14 to the post 2. Thus far described the bell assembly 14 is conventional in construction and layout.

Figure 3:
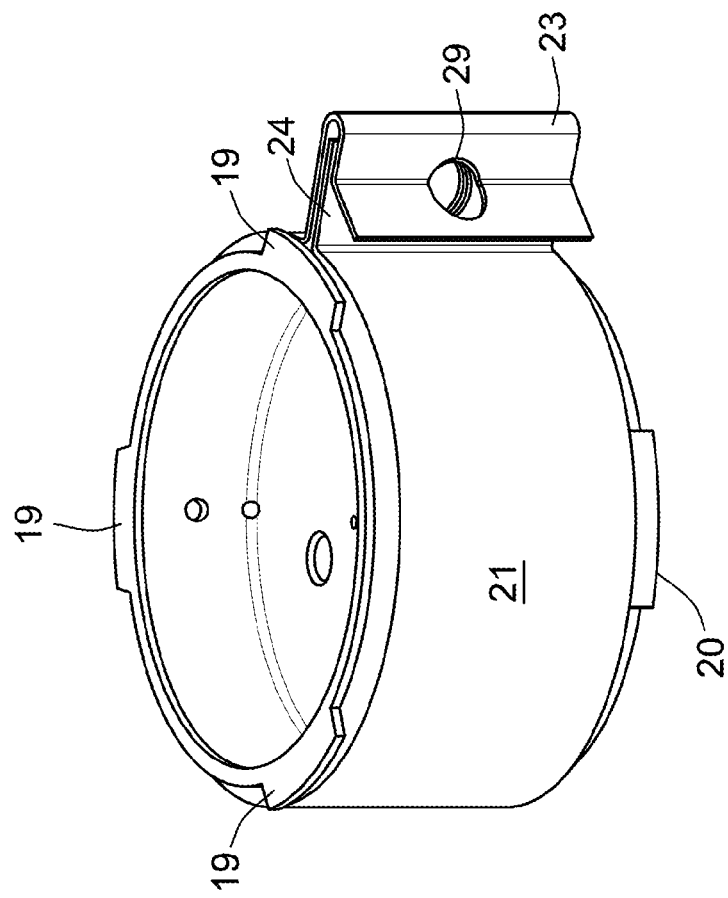
FIG. 3 shows an enlarged view of the anti-tamper device fitted to a base of the bell housing, according to an embodiment of the invention.

It will be seen in FIG. 2, the aluminum base 17 is provided with radially-outwardly-projecting tabs 19 and 20. There are three each of tabs 19 and 20 equiangularly spaced about the upper and lower rim of the base 17. A circumferential locking collar 21 is shown fitted to the base between the upper and lower tabs 19, 20. The tabs 19, 20 prevent the collar 21 being moved along the axis of the bell assembly 14 as depicted by arrow 22. The arrangement of base 17 and collar 21 is shown in greater detail in FIG. 3. When in position, the collar 21 prevents access to the hardware which fix the bell assembly 14 to the post 2 and its removal.

Figure 4:
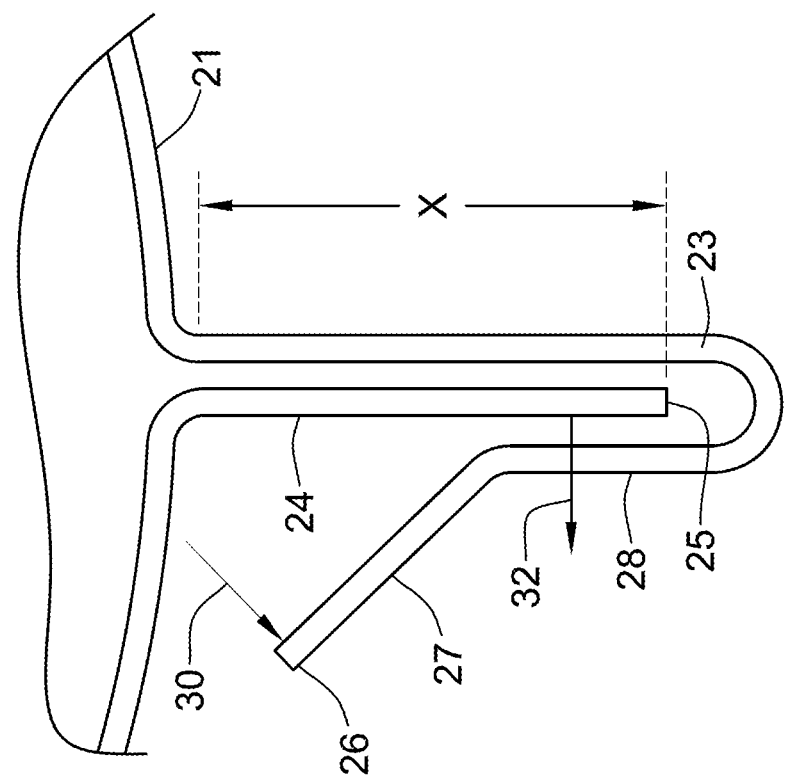
FIG. 4 is a partial plan view of the anti-tamper device showing the configuration of lock tabs, according to an embodiment of the invention.

The collar 21 is formed as an annulus from a strip of aluminum, or other similar material. The ends of the strip are folded into lock tabs 23 and 24. These are shown in greater detail in the partial plan view of FIG. 4. It will be seen that the lock tab 23 is bent radially outwards from the collar 21. It has a length, "X", and the outermost end 25 is covered by the lock tab 23.

Lock tab 23 has a rather more complicated shape than that of lock tab 24. It will be seen that it is formed into a generally U-shaped loop, or portion, with the end 25 positioned when the collar is closed within the trough of the U-shaped portion. The U-shaped portion has a free end 26 at the end of a cranked portion 27 of a limb 28. This facilitates closure of the collar as will be described later.

Figure 5:
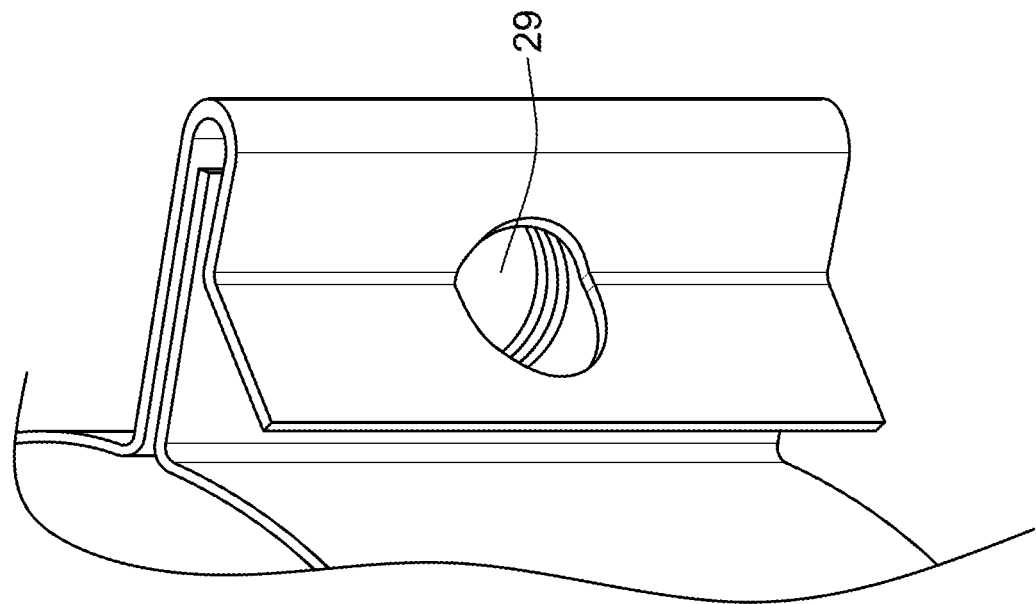
FIG. 5 is a partial perspective view of the lock tabs, according to an embodiment of the invention.

FIG. 5 illustrates a partial perspective view of the lock tabs 23, 24, according to an embodiment of the invention. As shown, holes 29 are drilled through the lock tabs 23 and 24 in aligned relationship during manufacture to permit the insertion of a shackle of a padlock (not shown) to fix them together and prevent opening of the collar 21 and its removal.

To assemble the collar 21 to the bell assembly 14, the collar 21 is opened by applying outwards force to the free end 26 in the direction of arrow 30. This permits the collar 21 to be placed about the base 17 and aligned between the tabs 19 and 20. The free end 26 is then released and the U-shaped portion closes (the U-shaped portion providing a degree of resilient bias) in turn closing the collar 21. The shackle of a padlock is then inserted through the holes 29 to prevent the U-shaped portion being opened. The outer limb 28 limits the lock tab 24 movement the direction of arrow 32 which prevents any manipulation of the collar 21 to open the collar 21 and its unauthorized removal. It will be appreciated that the U-shaped portion may have a bottom limb of limited dimension to approximate a "V" whilst still performing the function of accepting the lock tab 24 and limiting its movement.

The above describes only one embodiment of the present invention and modifications, obvious to those skilled in the art, can be made thereto without departing from the scope and spirit of the present invention. In particular, it will be appreciated that the materials used and the type of crossing to which the invention is applied may be varied. The invention may find application to a range of crossing types and is not limited in its broadest aspect to railroads.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An access control point traffic barrier, said barrier comprising:
   a post;
   a sounding device assembly mounted at a first end of the post, the sounding device assembly having a housing surrounding a sounding device; and
   an anti-tamper device comprising:
      a collar fitted about the housing to prevent access to the housing, the housing being provided with tabs to prevent movement of the collar relative to the housing in a first direction, the collar comprising first and second ends extending generally radially outwardly from the collar, the second end being formed into two limbs in a U-shaped portion and the first end being located within the U-shaped portion during a closed position of the collar such that radial expansion of the collar is limited by abutment of the first end with the limbs of the second end; and
   wherein the first and second ends are provided with aligned holes through which a shackle of a lock may be inserted.

2. The barrier of claim 1 wherein the barrier controls access to a traffic crossing.

3. The barrier of claim 1 wherein the barrier controls access to a railroad crossing.

4. The barrier of claim 1, wherein the sounding device is a bell.

5. The barrier of claim 1, wherein the limbs of the U-shaped portion comprise a first limb fixed to the collar and a second limb which is free at one end, the free end permitting the application of an opening force to permit opening of the U-shaped portion to allow insertion of the first end into the U-shaped portion.

6. The barrier of claim 5, wherein the free end is bent at an angle with respect to the rest of the limb.

\* \* \* \* \*